(12) United States Patent
Sundararajan et al.

(10) Patent No.: US 11,533,257 B2
(45) Date of Patent: *Dec. 20, 2022

(54) POLICY PLANE INTEGRATION ACROSS MULTIPLE DOMAINS

(71) Applicant: Cisco Technology, Inc., San Jose, CA (US)

(72) Inventors: Balaji Sundararajan, Fremont, CA (US); Khalil A. Jabr, Lake Oswego, OR (US); Anand Oswal, Pleasanton, CA (US); Vivek Agarwal, Campbell, CA (US); Chandramouli Balasubramanian, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/164,553

(22) Filed: Feb. 1, 2021

(65) Prior Publication Data
US 2021/0160179 A1 May 27, 2021

Related U.S. Application Data

(63) Continuation of application No. 16/560,849, filed on Sep. 4, 2019, now Pat. No. 10,938,717.

(51) Int. Cl.
*H04L 45/64* (2022.01)
*H04L 12/46* (2006.01)
(Continued)

(52) U.S. Cl.
CPC .......... *H04L 45/64* (2013.01); *H04L 12/4641* (2013.01); *H04L 45/04* (2013.01);
(Continued)

(58) Field of Classification Search
CPC ....... H04L 45/04; H04L 45/30; H04L 45/302; H04L 45/38; H04L 45/50; H04L 45/64;
(Continued)

(56) References Cited

U.S. PATENT DOCUMENTS

| 9,985,883 B2 | 5/2018 | MeLampy et al. |
| 10,355,989 B1 * | 7/2019 | Panchal ................. H04L 67/10 |

(Continued)

FOREIGN PATENT DOCUMENTS

| CN | 107547371 A | 1/2018 | |
| WO | WO-2019164738 A1 * | 8/2019 | ......... H04L 12/4641 |

OTHER PUBLICATIONS

Risdianto, Aris Cahyadi, et al., "Enhanced ONOS SDN controllers deployment of federated multi-domain SDN-Cloud with SD-Routing-Exchange," Malaysian Journal of Computer Science, Jun. 2017, 21 pages.

(Continued)

*Primary Examiner* — Kevin D Mew
(74) *Attorney, Agent, or Firm* — Polsinelli

(57) ABSTRACT

Systems, methods, and computer-readable media for interconnecting SDWANs through segment routing. A first SDWAN and a second SDWAN of a SDWAN fabric can be identified. A segment routing domain that interconnects the first SDWAN and the second SDWAN can be formed across a WAN underlay of the SDWAN fabric. Data transmission between the first SDWAN and the second SDWAN can be controlled by performing segment routing through the segment routing domain formed between the first SDWAN and the second SDWAN.

20 Claims, 9 Drawing Sheets

(51) Int. Cl.
  *H04L 45/02* (2022.01)
  *H04L 45/50* (2022.01)
  *H04L 47/2441* (2022.01)
  *H04L 9/40* (2022.01)
(52) U.S. Cl.
  CPC .......... *H04L 45/50* (2013.01); *H04L 47/2441* (2013.01); *H04L 63/162* (2013.01)
(58) Field of Classification Search
  CPC . H04L 47/24; H04L 47/2441; H04L 47/2483; H04L 12/4641; H04L 63/162
  See application file for complete search history.

(56) References Cited

U.S. PATENT DOCUMENTS

| | | | |
|---|---|---|---|
| 10,938,716 B1* | 3/2021 | Chin | H04L 45/38 |
| 11,412,051 B1* | 8/2022 | Chiganmi | H04L 12/4641 |
| 2016/0218947 A1* | 7/2016 | Hughes | H04J 11/00 |
| 2016/0380886 A1 | 12/2016 | Blair et al. | |
| 2017/0026417 A1* | 1/2017 | Ermagan | H04L 61/251 |
| 2017/0346722 A1 | 11/2017 | Smith et al. | |
| 2019/0036780 A1 | 1/2019 | Evans et al. | |
| 2019/0036816 A1* | 1/2019 | Evans | H04L 43/20 |
| 2019/0052558 A1 | 2/2019 | Mehta et al. | |
| 2019/0268973 A1 | 8/2019 | Bull et al. | |
| 2020/0014615 A1* | 1/2020 | Michael | H04L 41/12 |
| 2020/0153701 A1 | 5/2020 | Mohan et al. | |
| 2020/0177550 A1 | 6/2020 | Vallur et al. | |
| 2020/0177629 A1* | 6/2020 | Hooda | H04L 47/125 |
| 2020/0213199 A1 | 7/2020 | Sethi et al. | |
| 2020/0273314 A1 | 8/2020 | Bordeleau et al. | |
| 2020/0287819 A1 | 9/2020 | Theogaraj et al. | |
| 2020/0296011 A1 | 9/2020 | Jain et al. | |
| 2020/0296023 A1 | 9/2020 | Kumar et al. | |
| 2020/0296029 A1 | 9/2020 | Shenoy | |
| 2020/0313979 A1 | 10/2020 | Kumaran et al. | |
| 2020/0314022 A1 | 10/2020 | Vasseur et al. | |
| 2020/0382402 A1* | 12/2020 | Kolar | H04L 41/5025 |
| 2020/0389393 A1* | 12/2020 | Bosch | H04L 61/4511 |

OTHER PUBLICATIONS

Ventre, Pier Luigi, et al., "SDN Architecture and Southbound APIs for IPv6 Segment Routing Enabled Wide Area Networks," Oct. 14, 2018, 14 pages.

International Search Report and Written Opinion from the International Searching Authority, dated Nov. 20, 2020, 13 pages, for corresponding International Patent Application No. PCT/US2020/046676.

Dunbar, L., "Segment routing for SD-WAN paths over hybrid networks," draft-dunbar-sr-sdwan-over-hybrid-networks-01, Jun. 18, 2018, 24 pages, Network Working Group

* cited by examiner

POLICY PLANE INTEGRATION ACROSS MULTIPLE DOMAINS

CROSS-REFERENCE TO RELATED APPLICATION

This application is a continuation of U.S. Non-Provisional patent application Ser. No. 16/560,849, filed Sep. 4, 2019, the full disclosure of which is hereby expressly incorporated by reference in its entirety.

TECHNICAL FIELD

The subject matter of this disclosure relates in general to the field of computer networking, and more particularly, to systems and methods for interconnecting SDWANs through segment routing.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional wide area network (WAN) architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined enterprise network solutions have been developed to address these challenges. Software-defined enterprise networking is part of a broader technology of software-defined networking (SDN) that includes both software-defined wide area networks (SD-WAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. Software-defined enterprise networking can apply these principles of SDN to the WAN and a local area network (LAN).

Currently SDWANs can be combined to form a single network, e.g. a very large network. For example, regional campus networks can form a very large network of one or more entities. Specifically, instead of building one large SDWAN, a hierarchy of SDWANs can be created to form a network by building regional SD-WAN networks/clouds. Often these regional SDWANs are terminated at hub sites, Data Centers and/or colocation facilities. In forming a network through a plurality of SDWANs, facilitating communication between the SDWANs, e.g. interconnecting the SDWANs, is critical to ensuring that the network functions properly. However, interconnecting separate SDWANs is difficult to accomplish. Specifically, interconnecting separate SDWANs through a SDWAN fabric supporting the SDWANs is difficult to properly implement. There therefore exist needs for systems and methods of interconnecting separate SDWANs forming a larger network. More specifically, there exist needs for systems and methods of interconnecting separate SDWANs through a SDWAN fabric in which the SDWANs are formed.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
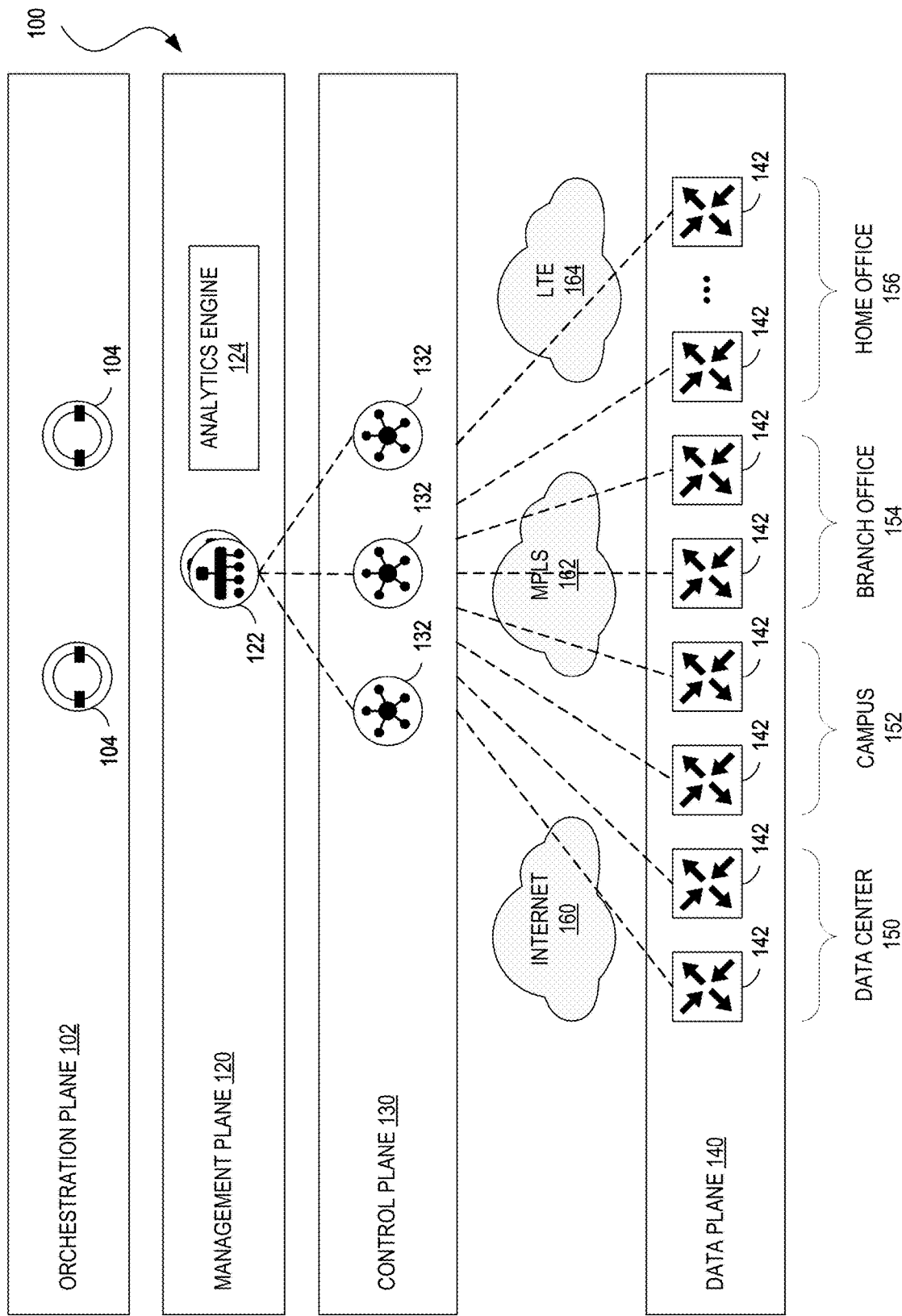
FIG. 1 illustrates an example of a high-level network architecture in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A method can include identifying a first SDWAN and a second SDWAN of a SDWAN fabric. A segment routing domain through the SDWAN fabric can be formed across a WAN underlay that interconnects the first SDWAN and the second SDWAN. Data transmission between the first SDWAN and the second SDWAN can be controlled by performing segment routing through the segment routing domain formed between the first SDWAN and the second SDWAN.

In various embodiments, the segment routing domain can be formed through the SDWAN fabric by pre-building a plurality of paths through the WAN underlay between the first SDWAN and the second SDWAN. The plurality of paths can be selectable to control data transmission between the first SDWAN and the second SDWAN through the segment routing domain.

In certain embodiments, the plurality of paths can be changeable to control data transmission between the first SDWAN and the second SDWAN through the segment routing domain.

In various embodiments, performance measurements of links in the WAN underlay forming paths in the segment routing domain can be gathered. Segment routing through the segment routing domain can be controlled based on the performance measurements of the links in the WAN underlay to control data transmission between the first SDWAN and the second SDWAN over the paths in the segment routing domain.

In certain embodiments, the performance measurements of the links in the WAN underlay can include one or a combination of congestion, latency, a number of packet drops, and an amount of jitter in the links in the WAN underlay.

In various embodiments, the performance measurements can be collected as streaming telemetry data from nodes forming the links in the WAN underlay.

In certain embodiments, paths in the segment routing domain between the first SDWAN and the second SDWAN can be identified. The paths in the segment routing domain can be associated with specific traffic classes of data capable of being transmitted between the first SDWAN and the second SDWAN. In turn, transmission of data between the first SDWAN and the second SDWAN over a specific path in the segment routing domain can be controlled based on a traffic class of the data and associations of the paths with specific traffic classes of data. Two nodes in an identified path in the segment routing domain between the first SDWAN and the second SDWAN can be configured as path computation element nodes in the WAN underlay by a segment routing controller.

In various embodiments, performance healths of the paths in the segment routing domain between the first SDWAN and the second SDWAN can be ascertained. A new path in the segment routing domain can be identified based on the performance healths of the paths in the segment routing domain. The new path can be associated with a specific traffic class of the data capable of being transmitted between the first SDWAN and the second SDWAN. Transmission of data of the specific traffic class through the new path can be controlled based on an association of the new path to the specific traffic class. The new path can be associated with the specific traffic class to replace a path previously associated with the specific traffic class. Further, the new path can be identified based on quality of service requirements for transmitting the data of the specific traffic class between the first SDWAN and the second SDWAN.

In certain embodiments quality of service requirements for transmitting data of a specific traffic class between the first SDWAN and the second SDWAN can be ascertained. An appropriate path in the segment routing domain between the first SDWAN and the SDWAN can be identified based on the quality of service requirements. In turn, transmission of data of the specific traffic class over the appropriate path in the segment routing domain between the first SDWAN and the second SDWAN can be controlled through segment routing.

In various embodiments, the segment routing domain can utilize media access control security (MACsec) encryption to transmit data between the first SDWAN and the second SDWAN.

A system can include one or more processors and at least one computer-readable storage medium storing instructions which, when executed by the one or more processors, cause the one or more processors to identify a first SWAN and a second SDWAN of a SDWAN fabric. The instructions can also cause the one or more processors to form a segment routing domain through the SDWAN fabric that interconnects the first SDWAN and the second SDWAN across WAN underlay of the SDWAN fabric by pre-building a plurality of selectable paths through the WAN underlay between the first SDWAN and the second SDWAN. Further, the instructions can cause the one or more processors to control data transmission between the first SDWAN and the second SDWAN by performing segment routing through the segment routing domain formed between the first SDWAN and the second SDWAN.

A non-transitory computer-readable storage medium having stored therein instructions which, when executed by a processor, cause the processor to identify a first SDWAN and a second SDWAN of a SDWAN fabric. The instructions can also cause the processor to form a segment routing domain through the SDWAN fabric that interconnects the first SDWAN and the second SDWAN across a WAN underlay of the SDWAN fabric. Further, the instructions can cause the processor to control data transmission between the first SDWAN and the second SDWAN by performing segment routing through one or more changeable paths in the segment routing domain formed between the first SDWAN and the second SDWAN.

Example Embodiments

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
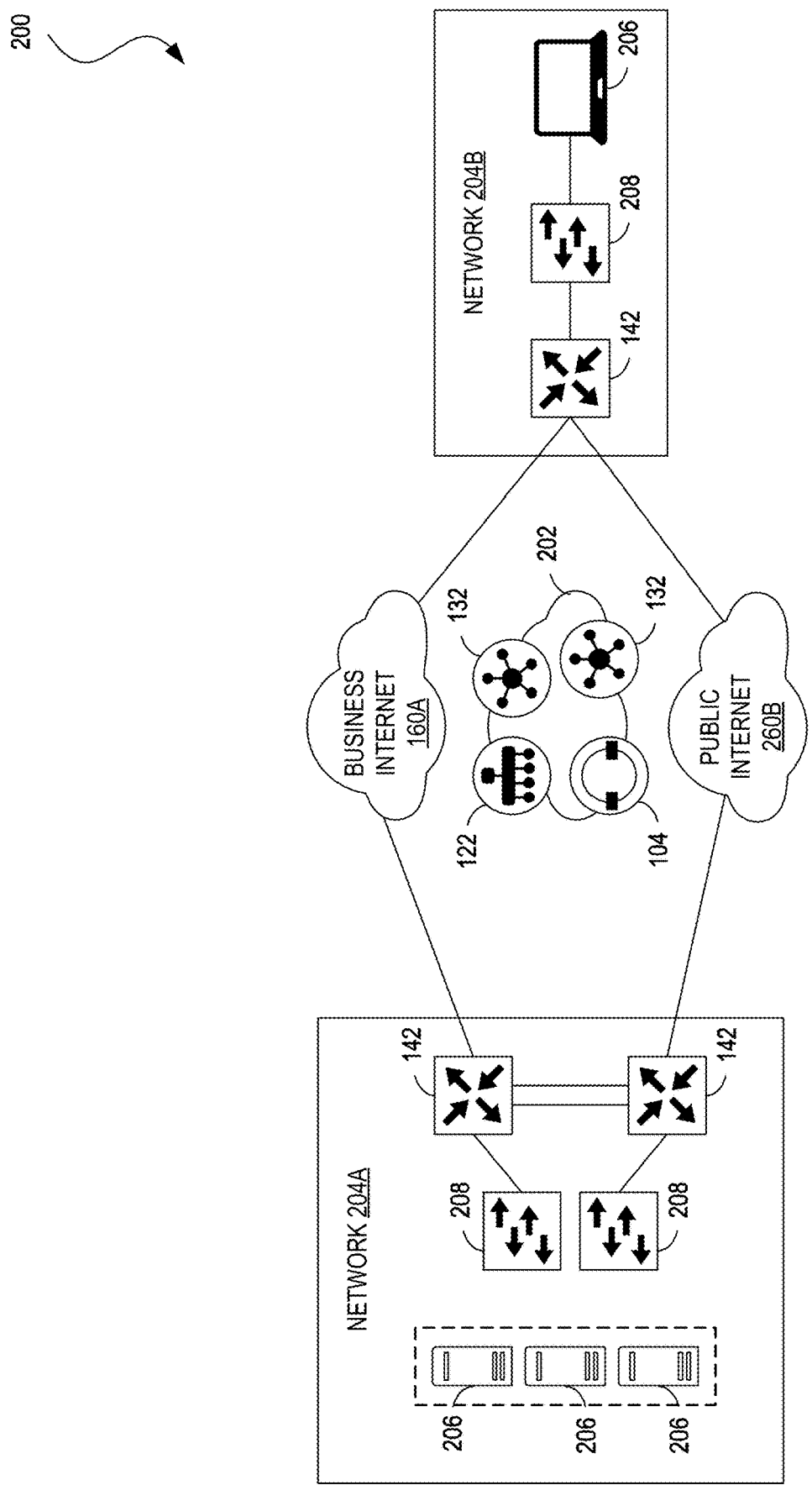
FIG. 2 illustrates an example of a network topology in accordance with an embodiment.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3 g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
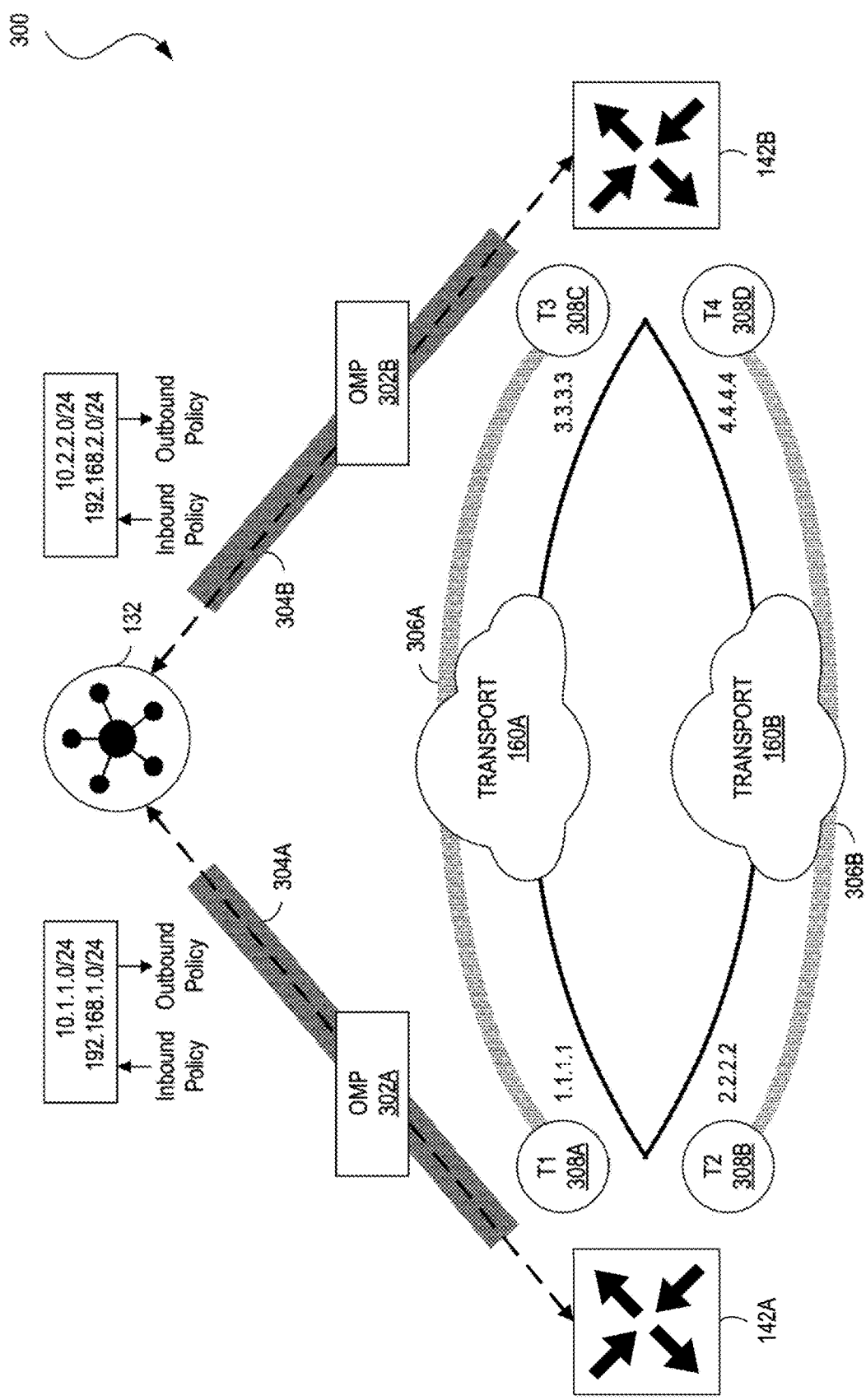
FIG. 3 illustrates an example of a diagram showing the operation of a protocol for managing an overlay network in accordance with an embodiment.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
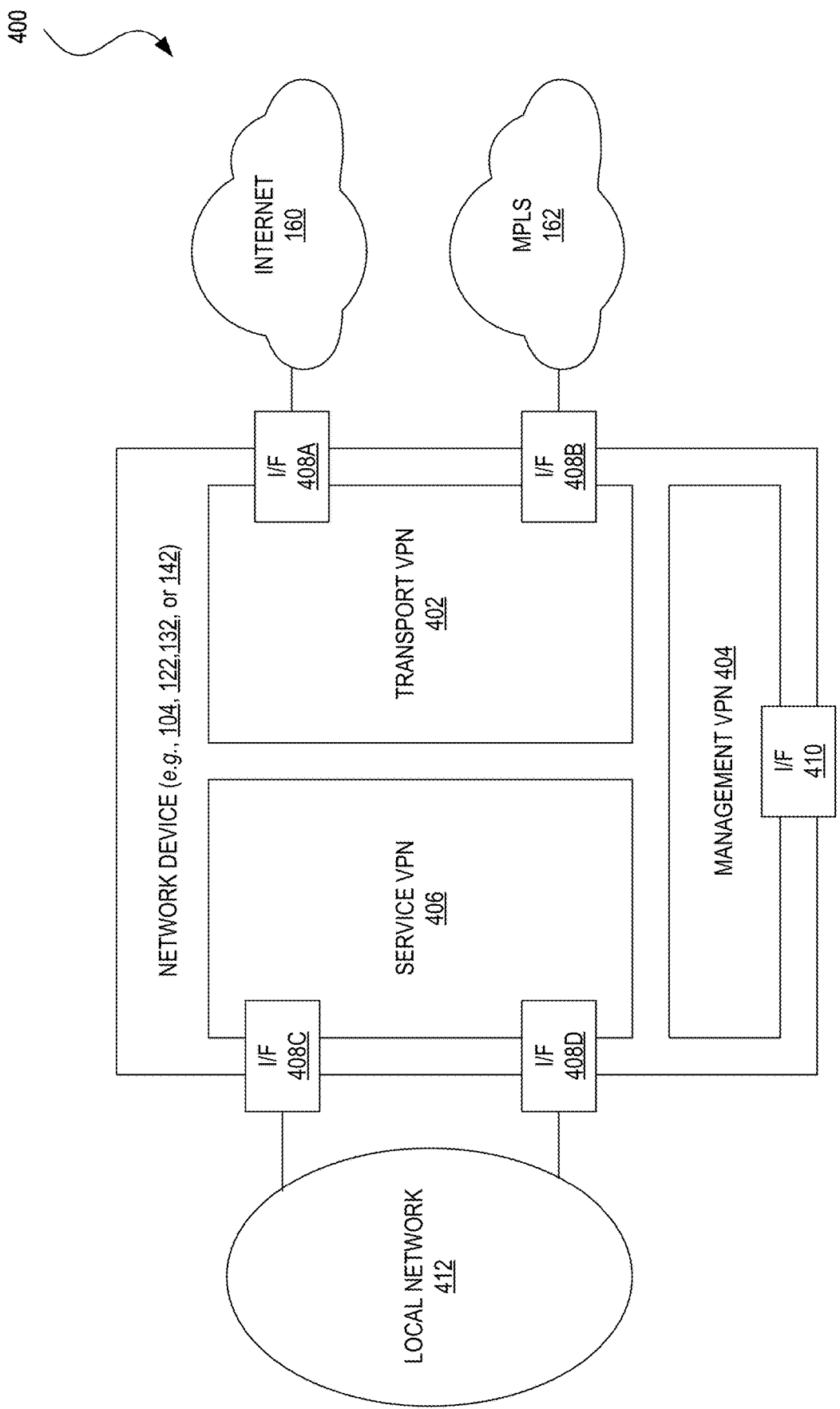
FIG. 4 illustrates an example of a diagram showing the operation of virtual private networks for segmenting a network in accordance with an embodiment.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5A:
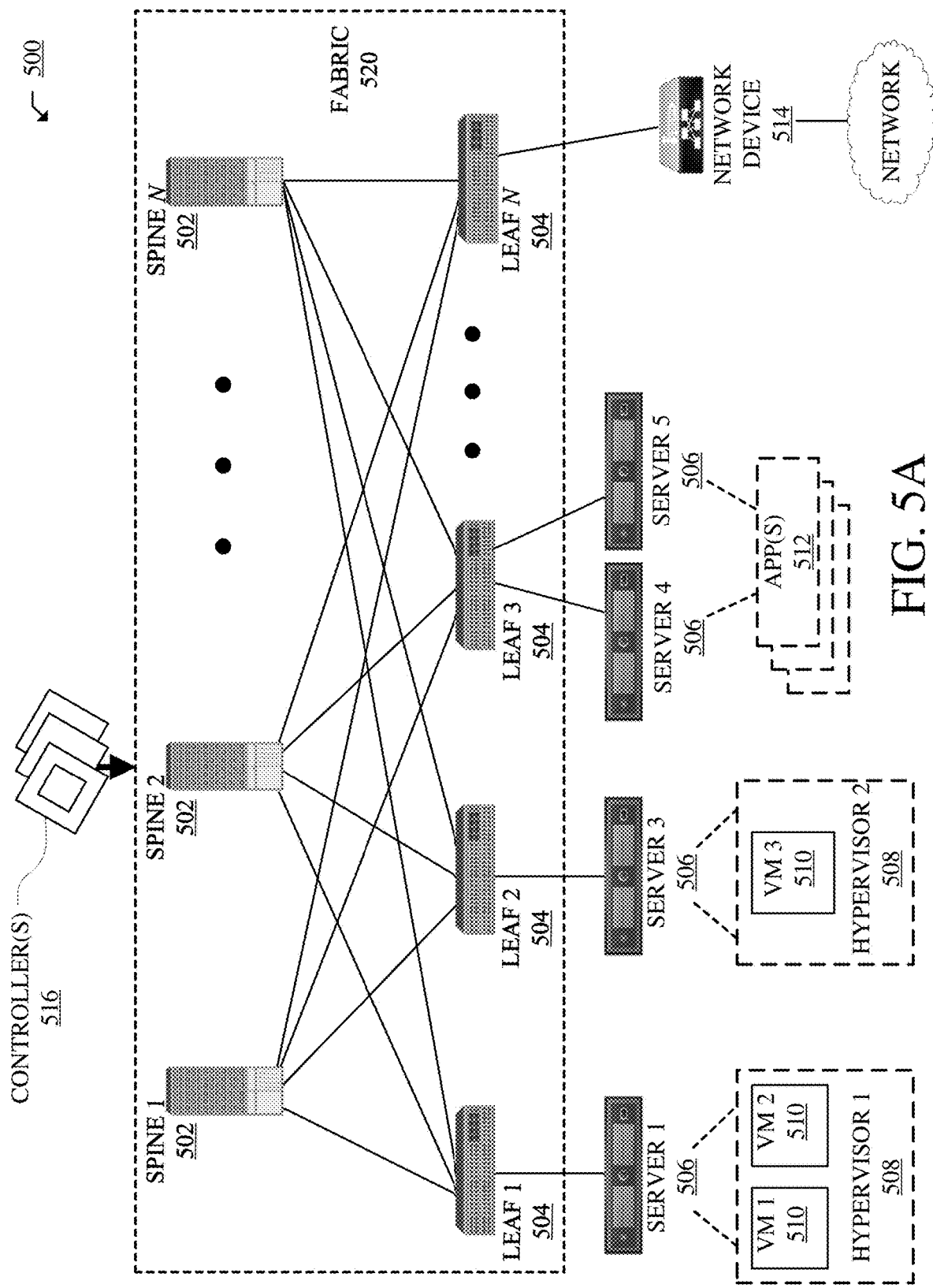
FIG. 5A illustrates a diagram of an example Network Environment, such as a data center.

FIG. 5A illustrates a diagram of an example Network Environment 500, such as a data center. In some cases, the Network Environment 500 can include a data center, which can support and/or host a cloud environment. The Network Environment 500 can include a Fabric 520 which can represent the physical layer or infrastructure (e.g., underlay) of the Network Environment 500. Fabric 520 can include Spines 502 (e.g., spine routers or switches) and Leafs 504 (e.g., leaf routers or switches) which can be interconnected for routing or switching traffic in the Fabric 520. Spines 502 can interconnect Leafs 504 in the Fabric 520, and Leafs 504 can connect the Fabric 520 to an overlay or logical portion of the Network Environment 500, which can include application services, servers, virtual machines, containers, endpoints, etc. Thus, network connectivity in the Fabric 520 can flow from Spines 502 to Leafs 504, and vice versa. The interconnections between Leafs 504 and Spines 502 can be redundant (e.g., multiple interconnections) to avoid a failure in routing. In some embodiments, Leafs 504 and Spines 502 can be fully connected, such that any given Leaf is connected to each of the Spines 502, and any given Spine is connected to each of the Leafs 504. Leafs 504 can be, for example, top-of-rack ("ToR") switches, aggregation switches, gateways, ingress and/or egress switches, provider edge devices, and/or any other type of routing or switching device.

Leafs 504 can be responsible for routing and/or bridging tenant or customer packets and applying network policies or rules. Network policies and rules can be driven by one or more Controllers 516, and/or implemented or enforced by one or more devices, such as Leafs 504. Leafs 504 can connect other elements to the Fabric 520. For example, Leafs 504 can connect Servers 506, Hypervisors 508, Virtual Machines (VMs) 510, Applications 512, Network Device 514, etc., with Fabric 520. Such elements can reside in one or more logical or virtual layers or networks, such as an overlay network. In some cases, Leafs 504 can encapsulate and decapsulate packets to and from such elements (e.g., Servers 506) in order to enable communications throughout Network Environment 500 and Fabric 520. Leafs 504 can also provide any other devices, services, tenants, or workloads with access to Fabric 520. In some cases, Servers 506 connected to Leafs 504 can similarly encapsulate and decapsulate packets to and from Leafs 504. For example, Servers 506 can include one or more virtual switches or routers or tunnel endpoints for tunneling packets between an overlay or logical layer hosted by, or connected to, Servers 506 and an underlay layer represented by Fabric 520 and accessed via Leafs 504.

Applications 512 can include software applications, services, containers, appliances, functions, service chains, etc. For example, Applications 512 can include a firewall, a database, a CDN server, an IDS/IPS, a deep packet inspection service, a message router, a virtual switch, etc. An application from Applications 512 can be distributed, chained, or hosted by multiple endpoints (e.g., Servers 506, VMs 510, etc.), or may run or execute entirely from a single endpoint.

VMs 510 can be virtual machines hosted by Hypervisors 508 or virtual machine managers running on Servers 506. VMs 510 can include workloads running on a guest operating system on a respective server. Hypervisors 508 can provide a layer of software, firmware, and/or hardware that creates, manages, and/or runs the VMs 510. Hypervisors 508 can allow VMs 510 to share hardware resources on Servers 506, and the hardware resources on Servers 506 to appear as multiple, separate hardware platforms. Moreover, Hypervisors 508 on Servers 506 can host one or more VMs 510.

In some cases, VMs 510 can be migrated to other Servers 506. Servers 506 can similarly be migrated to other physical locations in Network Environment 500. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 506, Hypervisors 508, and/or VMs 510 can represent or reside in a tenant or customer space. Tenant space can include workloads, services, applications, devices, networks, and/or resources that are associated with one or more clients or subscribers. Accordingly, traffic in Network Environment 500 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 516, Servers 506, Leafs 504, etc.

Configurations in Network Environment 500 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., ACI or VMWARE NSX). To illustrate, one or more administrators can define configurations at a logical level (e.g., application or software level) through Controllers 516, which can implement or propagate such configurations through Network Environment 500. In some examples, Controllers 516 can be Application Policy Infrastructure Controllers (APICs) in an ACI framework. In other examples, Controllers 516 can be one or more management components for associated with other SDN solutions, such as NSX Managers.

Such configurations can define rules, policies, priorities, protocols, attributes, objects, etc., for routing and/or classifying traffic in Network Environment 500. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 500, such as Leafs 504, Servers 506, Hypervisors 508, Controllers 516, etc. As previously explained, Network Environment 500 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 500. Endpoints can have one or more attributes such as a VM name, guest OS name, a security tag, application profile, etc. Application configurations can be applied between EPGs, instead of endpoints directly, in the form of contracts. Leafs 504 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 504 can tie packets with their attribute EPGs based on their identifiers and enforce policies, which can be implemented and/or managed by one or more Controllers 516. Leaf 504 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 5A, Network Environment 500 can deploy different hosts via Leafs 504, Servers 506, Hypervisors 508, VMs 510, Applications 512, and Controllers 516, such as VMWARE ESXi hosts, WINDOWS HYPER-V hosts, bare metal physical hosts, etc. Network Environment 500 may interoperate with a variety of Hypervisors 508, Servers 506 (e.g., physical and/or virtual servers), SDN orchestration platforms, etc. Network Environment 200 may implement a declarative model to allow its integration with application design and holistic network policy.

Controllers 516 can provide centralized access to fabric information, application configuration, resource configuration, application-level configuration modeling for a SDN infrastructure, integration with management systems or servers, etc. Controllers 516 can form a control plane that interfaces with an application plane via northbound APIs and a data plane via southbound APIs.

As previously noted, Controllers 516 can define and manage application-level model(s) for configurations in Network Environment 500. In some cases, application or device configurations can also be managed and/or defined by other components in the network. For example, a hypervisor or virtual appliance, such as a VM or container, can run a server or management tool to manage software and services in Network Environment 500, including configurations and settings for virtual appliances.

As illustrated above, Network Environment 500 can include one or more different types of SDN solutions, hosts, etc. For the sake of clarity and explanation purposes, various examples in the disclosure will be described with reference to an ACI framework, and Controllers 516 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 506 (e.g., physical or logical), Hypervisors 508, VMs 510, containers (e.g., Applications 512), etc., and can run or include any type of server or application solution. Non-limiting examples of "hosts" can include virtual switches or routers, such as distributed virtual switches (DVS), AVE nodes, vector packet processing (VPP)

switches; VCENTER and NSX MANAGERS; bare metal physical hosts; HYPER-V hosts; VMs; DOCKER Containers; etc.

Figure 5B:
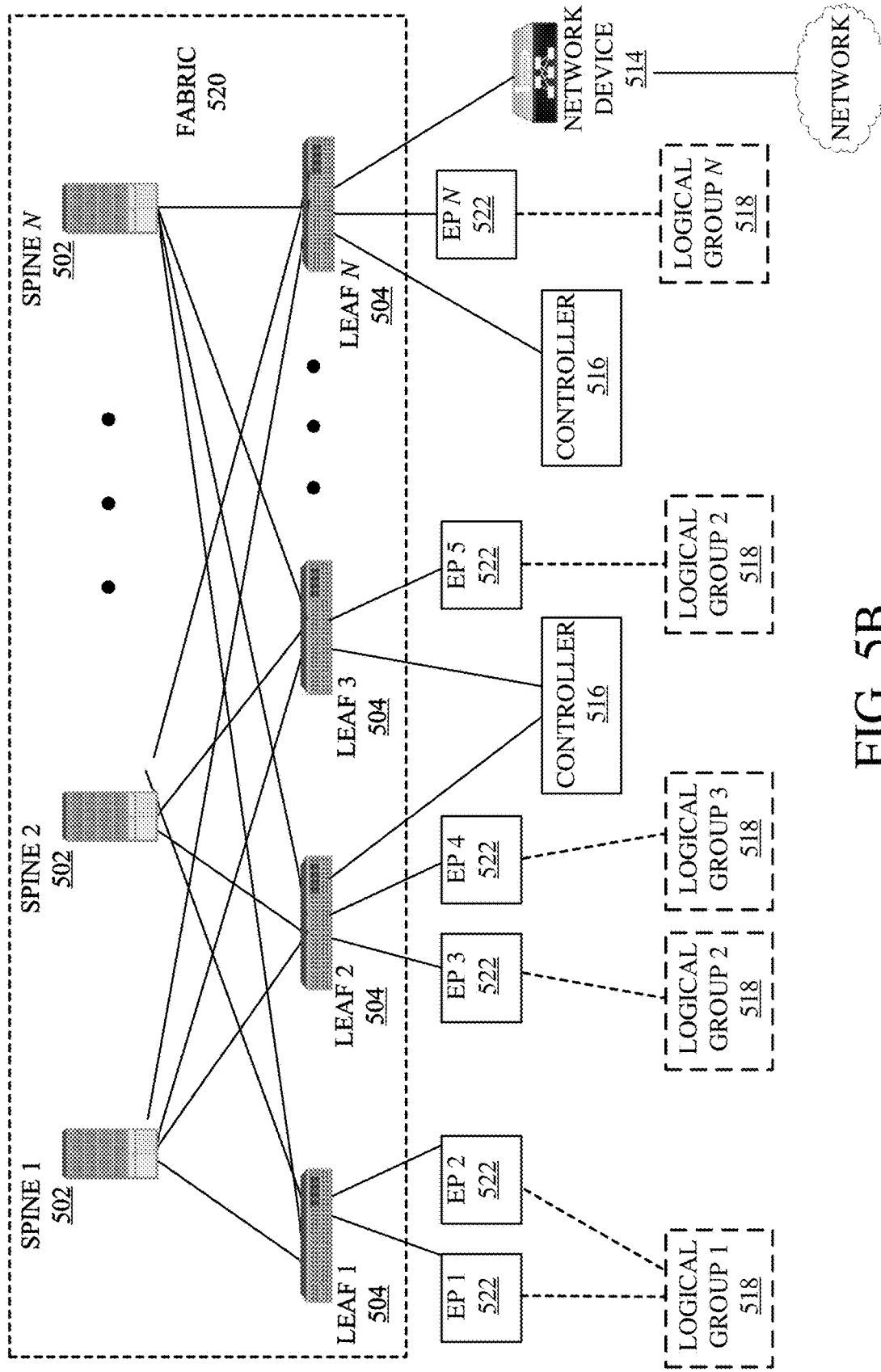
FIG. 5B illustrates another example of Network Environment.

FIG. 5B illustrates another example of Network Environment 500. In this example, Network Environment 500 includes Endpoints 522 connected to Leafs 504 in Fabric 520. Endpoints 522 can be physical and/or logical or virtual entities, such as servers, clients, VMs, hypervisors, software containers, applications, resources, network devices, workloads, etc. For example, an Endpoint 522 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 522 can have an address (e.g., an identity), a location (e.g., host, network segment, VRF instance, domain, etc.), one or more attributes (e.g., name, type, version, patch level, OS name, OS type, etc.), a tag (e.g., security tag), a profile, etc.

Endpoints 522 can be associated with respective Logical Groups 518. Logical Groups 518 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 518 are EPGs in an ACI environment and/or other logical groups (e.g., SGs) in another SDN environment.

Traffic to and/or from Endpoints 522 can be classified, processed, managed, etc., based Logical Groups 518. For example, Logical Groups 518 can be used to classify traffic to or from Endpoints 522, apply policies to traffic to or from Endpoints 522, define relationships between Endpoints 522, define roles of Endpoints 522 (e.g., whether an endpoint consumes or provides a service, etc.), apply rules to traffic to or from Endpoints 522, apply filters or access control lists (ACLs) to traffic to or from Endpoints 522, define communication paths for traffic to or from Endpoints 522, enforce requirements associated with Endpoints 522, implement security and other configurations associated with Endpoints 522, etc.

In an ACI environment, Logical Groups 518 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

As discussed previously, the enterprise network landscape is continuously evolving. There is a greater demand for mobile and IoT device traffic, SaaS applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple MPLS transports, or MPLS paired with Internet or LTE links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined enterprise network solutions have been developed to address these challenges. Software-defined enterprise networking is part of a broader technology of SDN that includes both SDWANs and SDLANs. SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. Software-defined enterprise networking can apply these principles of SDN to the WAN and a LAN.

Currently SDWANs can be combined to form a single network, e.g. a very large network. For example, regional campus networks can form a very large network of one or more entities. Specifically, instead of building one large SDWAN, a hierarchy of SDWANs can be created to form a network by building regional SD-WAN networks/clouds. Often these regional SDWANs are terminated at hub sites, Data Centers and/or colocation facilities. In forming a network through a plurality of SDWANs, facilitating communication between the SDWANs, e.g. interconnecting the SDWANs, is critical to ensuring that the network functions properly. However, interconnecting separate SDWANs is difficult to accomplish. Specifically, interconnecting separate SDWANs through a SDWAN fabric supporting the SDWANs is difficult to properly implement. There therefore exist needs for systems and methods of interconnecting separate SDWANs forming a larger network. More specifically, there exist needs for systems and methods of interconnecting separate SDWANs through a SDWAN fabric in which the SDWANs are formed.

The present includes systems, methods, and computer-readable media for solving these problems/discrepancies by interconnecting SDWANs through segment routing. Specifically, a first SDWAN and a second SDWAN of a SDWAN fabric can be identified. A segment routing domain can be formed through the SDWAN fabric that interconnects the first SDWAN and the second SDWAN. Specifically, the segment routing domain can be formed across a WAN underlay of the SDWAN fabric to interconnect the first SDWAN and the second SDWAN. Data transmission between the first SDWAN and the second SDWAN can be controlled by performing segment routing through the segment routing domain formed between the first SDWAN and the second SDWAN.

The present systems, methods, and computer-readable media are advantageous over current cross-domain enforcement techniques for a number of reasons. Specifically, the benefits of an end-to-end SDWAN solution can be realized by interconnecting SDWANs through a segment routing domain built on a WAN core/underlay, effectively connecting the SDWANs to create an end-to-end SDWAN solution. Further, using a segment routing domain to interconnect SDWANs provides functionalities for building paths through the WAN core using software instantiated constructs (e.g. from a controller). As follows, due to the mechanisms of headend decision making and path selection that are characteristic of segment routing, paths for specific traffic can be picked based on characteristics of the traffic to more efficiently control data transmission between SDWANs. Further through the use of segment routing, paths can be changed reactively to more efficiently control data transmission between SDWANs. This is advantageous over typical network structures used to connect SDWANs, which are not usually capable of implementing path changes in controlling data transmission between SDWANs unless the path changes are pre-built.

Figure 6:
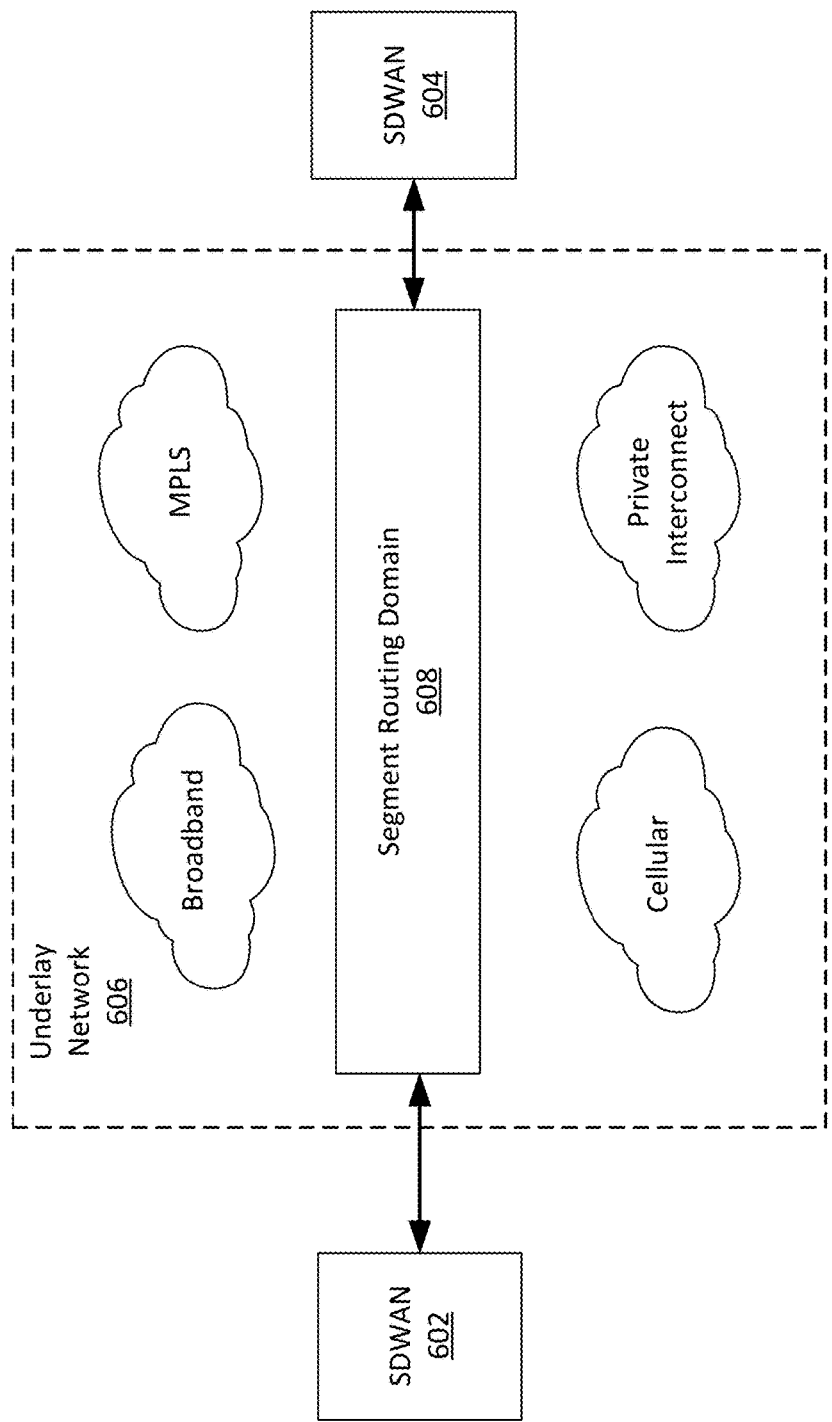
FIG. 6 shows an example network environment of interconnected SDWANs.

FIG. 6 shows an example network environment 600 of interconnected SDWANs. The example network environment 600 includes a first SDWAN 602 and a second SDWAN 604. The first and second SDWANs 602 and 604 can be applicable SDWANs in a network environment. For example, the first and second SDWANs 602 and 604 can be formed as part of datacenters, campus networks, regional office networks, and other applicable cloud environments. Further, the first and second SDWANs 602 and 604 can be implemented and managed using an applicable SDN architecture. For example, the first and second SDWANs 602 and 604 can be implemented using the network architecture 100 shown in FIG. 1. The first and second SDWANs 602 and 604 can be part of the same enterprise network. For example, the first and second SDWANs 602 and 604 can include a campus network and a datacenter of an enterprise at different locations.

The first and second SDWANs 602 and 604 can be formed as part of an SDWAN fabric. Specifically, the first and second SDWANs 602 and 604 can be formed by an applicable underlay network, such as the underlay network 606 shown in FIG. 6, of an SDWAN fabric. While the first and second SDWANs 602 and 604 are shown as being implemented separate from the underlay network 606, this is done for illustrative purposes, and all or portions of the first and second SDWANs 602 and 604 can actually be formed over the underlay network 606. Accordingly, the underlay network 606 can form part of the SDWAN fabric that includes the first and second SDWANs 602 and 604.

The underlay network 606 can be formed by one or more applicable networks. Specifically, the underlay network 606 can be formed through a broadband network, a MPLS network, a cellular network, and/or a private interconnect network. Further, the underlay network 606 can be formed through one or more networks of one or more network service providers. Specifically, the underlay network 606 can be formed by a cellular network and a broadband network of different network service providers. The underlay network 606 can serve as a WAN underlay that interconnects the first SDWAN 602 and the second SDWAN 604. Specifically, the first SDWAN 602 and the second SDWAN 604 can exchange data with each other across the underlay network 606, thereby interconnecting the first SDWAN 602 and the second SDWAN 604.

A segment routing domain 608 can be formed through the underlay network 606 to interconnect the first SDWAN 602 and the second SDWAN 604. In turn, data can be transmitted between the first SDWAN 602 and the second SDWAN 604 through the segment routing domain 608 to interconnect the first SDWAN 602 and the second SDWAN 604. Specifically, data transmission between the first SDWAN 602 and the second SDWAN 604 can be controlled using segment routing by controlling the transmission of data between the first SDWAN 602 and the second SDWAN 604 through the segment routing domain 608. By interconnecting the first SDWAN 602 and the second SDWAN 604 through the segment routing domain 608, the benefits of an end-to-end SDWAN solution can be realized. Specifically, the first SDWAN 602 and the second SDWAN 604 can communicate more efficiently and more securely with each other than typical solutions for interconnecting SDWANs, e.g. IPSEC solutions.

As part of forming the segment routing domain 608 in the underlay network 606, one or more paths can be identified and built in the underlay network 606 for connecting the SDWANs 602 and 604. The paths can be formed from a plurality of applicable network devices in the underlay network 606 to connect the SDWANs 602 and 604 through the underlay network 606. In turn and as will be discussed in greater detail later, the paths can be selectable based on traffic type, to control transmission of traffic between the SDWANs 602 and 604 through the segment routing domain 608 using segment routing. Subsequently, the traffic can be transmitted over the selected paths as part of transmitting the traffic between the first and second SDWANs 602 and 604 using segment routing. The segment routing domain 608 can transmit traffic between the first SDWAN 602 and the second SDWAN 604 using media access control security (MACsec) encryption.

The paths through the segment routing domain 608 can be built by an applicable software controller, e.g. a segment routing controller/path computation element controller associated with the segment routing domain 608. In establishing the pre-defined paths through the segment routing domain 608, the segment routing controller can configure the segment routing domain 608 to route traffic between the SDWANS 602 and 604 according to the selected path. Specifically, the segment routing controller can signal a list of segment(s) of the path to a head-end router/provider edge router in the segment routing domain 608. The list of segment(s) of the path can be used to program, at the provider edge router, a single per-flow state corresponding to the path. In turn, the provider edge router can insert the list of segments into packet headers for transmitting traffic through the path using segment routing. Further, the segment routing controller can add a binding segment ID ("BSID") for the path to the provider edge router in the segment routing domain 608. The BSID can be uniquely associated with or otherwise identify a specific policy for traffic associated with the path. In turn, the policy can be used, e.g. by the provider edge router, to transmit the traffic through the path using segment routing.

In various embodiments, the provider edge router can function as a route computation element node in the WAN underlay. Specifically, the provider edge router can function as a route computation element node by inserting segments into packet headers and using the BSID/policy to control traffic through the path. The segment routing controller can program two nodes in the path to function as route computation element nodes. For example, the segment routing controller can signal the list of segment(s) of the path and the BSID to two provider edge routers in the WAN underlay.

The path can be pushed, e.g. the choice of the path can be pushed, to an applicable controller, e.g. an SDWAN controller for either or both the first SDWAN 602 and the second SDWAN 604. Specifically, the choice of the path can be pushed to the SDWAN controller after or in conjunction with the segment routing controller configuring the path according to the previously described techniques. More specifically, the segment routing controller can push the BSID and other applicable attributes of the path, e.g. a list of segments in the path, to the SDWAN controller. In turn, the SDWAN controller can configure the first SDWAN 602 and the second SDWAN 604 to transmit traffic through the segment routing domain 608 using the path established by the segment routing controller. Specifically, the SDWAN controller can configure edge routers in the first SDWAN 602 and the second SDWAN 604 with policies to facilitate transmission of traffic through the path established by the segment routing controller through the segment routing domain 608.

Paths through the segment routing domain 608 can be uniquely associated with specific classes of traffic. In turn, traffic of a specific traffic class can be transmitted between the first SDWAN 602 and the second SDWAN 604 through a specific path in the segment routing domain that is associated with the specific traffic class. A traffic class can be defined by one or more applicable characteristics of traffic. Specifically, a traffic class can be defined based on one or a combination of a user group, an application group, a VPN group, a source, and a destination associated with traffic. For example, a traffic class can include data associated with a specific application executed as part of providing network service access. In another example, a traffic class can include data that is transmitted to and from a specific client in providing network service access.

In transmitting traffic through the segment routing domain 608 based on specific classes of the traffic, policies can be implemented to control traffic transmission based on traffic classes. A policy can be defined, at least in part, by an administrator. For example, an administrator can define a specific traffic class to control through the segment routing domain 608. A policy can also identify a specific path through the segment routing domain 608, e.g. as established by the segment routing controller, to transmit a specific class of traffic over. An applicable controller can implement a policy for controlling traffic transmission through the segment routing domain 608 based on traffic type. For example, the SDWAN controller can program a policy onto applicable edge routers in the first and second SDWANs 602 and 604 for controlling traffic transmission through the segment routing domain 608 based on traffic class. In another example, the segment routing controller can program an appropriate provider edge router in the underlay network 606 with a BSID corresponding to a policy for transmitting traffic through the segment routing domain 608 based on traffic class.

A path for transmitting specific traffic, e.g. a specific traffic class, through the segment routing domain 608 can be selected based on performance characteristics/measurements of links in the underlay network 606. In particular, a specific path can be identified and built based on performance measurements of links in the underlay network 606, as part of performing segment routing based on the performance measurements. Performance measurements can include applicable metrics related to transmission of data through the links in the underlay network 606. For example, performance measurements can include one or an applicable combination of congestion in the links, latency in the links, a number of packet drops in the links, and an amount of jitter in the links. Performance measurements can be identified from telemetry data received from nodes forming the links in the underlay network 606. The telemetry data can be streamed from the nodes to an applicable controller, e.g. either or both the SDWAN controller and the segment routing controller. In turn, the controller can identify the performance measurements of the links in the underlay network 606 from the streaming telemetry data.

Further, a path for transmitting specific traffic, e.g. traffic of a specific traffic class, through the segment routing domain 608 can be selected based on quality of service requirements associated with transmitting the specific traffic. Quality of service requirements can be specific to traffic based on a traffic class. In turn, the paths for transmitting specific classes of traffic through the segment routing domain 608 can be identified and established based on the quality of service requirements of the specific traffic classes. Quality of service requirements can include applicable performance requirements for transmitting traffic between the first SDWAN 602 and the second SDWAN 604. Specifically, quality of service requirements can include either or both bandwidth and latency thresholds/requirements for transmitting data, e.g. of a specific traffic class, between the first SDWAN 602 and the second SDWAN 604. Latency requirements can include threshold one-way data transmission times and threshold round-trip data delay times for transmitting data between sources and destinations. Bandwidth requirements can include threshold data transmission rates for transmitting data between sources and destinations. For example, quality of service requirements of an application can specify that traffic associated with the application should be transmitted between the first SDWAN 602 and the second SDWAN 604 at a specific average bit rate over a specific period of time.

A path for transmitting specific traffic e.g. a traffic class, through the segment routing domain 608 can be selected based on both quality of service requirements associated with the traffic and performance measurements of links in the underlay network 606. In turn, the selected path can be established/built through the segment routing domain 608 for transmitting traffic between the first SDWAN 602 and the second SDWAN 604 through segment routing. Specifically, a path can be identified and built with links that meet quality of service requirements of specific traffic. For example, the segment routing controller can select links that form a path having a bandwidth that meets a bandwidth threshold for transmitting a specific class of traffic between the first SDWAN 602 and the second SDWAN 604.

In an example of selecting a path through the segment routing domain 608 based on both quality of service requirements and performance measurements of links in the underlay network 606, an SDWAN capable router, e.g. a vEdge Router®, in the first SDWAN 602 can identify an application associated with a class of traffic and choose a specific path through the underlay network 606 to the second SDWAN 604. The SDWAN capable router can select the specific path based on performance measurements gathered for the underlay network 606. The path selected by the SDWAN capable router might be the shortest path through the underlay network 606. However, the path can still fail to meet quality of service requirements for the application, e.g. the latency threshold or bandwidth tolerance for the application. The router can then send the identified path to the SDWAN controller. The SDWAN controller can send the identified path as well as the quality of service requirements for the application to the segment routing controller, e.g. as part of a request for establishing a path for the application through the underlay network 606 in the segment routing domain 608. Further, the SDWAN controller can send the sources and destinations in the first SDWAN 602 and the second SDWAN 604 of traffic associated with the application.

Further in the example, the segment routing controller can identify a path through the underlay network 606 that meets quality of service requirements for the application. Specifically, the segment routing controller can identify the next shortest path, when compared to the path identified by the SDWAN capable router, that meets the quality of service requirements for the application. The segment routing controller can identify a path through the underlay network 606 that meets the quality of service requirements for the application based on performance measurements of the links, e.g. as determined from telemetry data gathered by nodes forming the links, in the underlay network 606.

Then, the segment routing controller can establish the path in the segment routing domain 608 using the previously described techniques for establishing a path through the segment routing domain 608. Specifically, the segment routing controller can program a provider edge router in the path with a list of the link segments in the path. Further, the segment routing controller can program the provider edge router with a BSID for a policy to control a flow of the application traffic through the path. As follows, the segment routing controller can send an identification of the path, e.g. the link segments in the path, the BSID for the policy of the path, and/or an indication that the path is established. The SDWAN controller can then configure the first SDWAN 602 and/or the second SDWAN 604 to transmit traffic of the application through the path in the segment routing domain 608. For example, the SDWAN controller can configure edge nodes in the first SDWAN 602, e.g. the SDWAN capable router, to transmit data of the application to the path in the segment routing domain 608, e.g. the provider edge node of the path in the segment routing domain 608.

The previously described techniques can be used to synchronize operations of both the SDWAN controller and the segment routing controller to transmit data through the segment routing domain 608 while meeting quality of service requirements. In turn, this can allow the SDWAN controller to take advantage of available low-latency paths in the underlay network 606 for SDWAN applications.

A path through the segment routing domain 608 that is used to transmit traffic of a specific class between the first SDWAN 602 and the second SDWAN 604 can be modified to effectively create a new path used to transmit the traffic. Alternatively, an entirely new path through the segment routing domain 608 can be formed for transmitting the traffic of the specific class between the first and second SDWANs 602 and 604. A new path, e.g. a modified path or entirely new path, can be identified and associated with the specific traffic class to replace the path previously associated with the specific traffic class. As follows, the traffic of the specific class can be transmitted over the new or modified path based on the association of the new or modified path with the specific traffic class of the traffic.

The new path can be established based on monitored performance healths of the paths through the segment routing domain 608. Health of a path can be defined according to performance measurements of the path in transmitting data between the first and second SDWANs 602 and 604. Specifically, the SDWAN controller can monitor a health of the path transmitting traffic through the segment routing domain based on performance measurements of links in the path, e.g. as indicated by received telemetry data. For example, health of a path can include a score that is determined based on load levels in the path, latency in the path, a number of packet drops in the path, and/or jitter in the path. In turn, the SDWAN controller can facilitate establishment of the new path based on the health of the path with respect to a threshold health level, e.g. if the health of the path drops below the threshold health level.

The new path can be established using the techniques described herein. Specifically, the segment routing controller can identify the new path, e.g. by modifying the path through the segment routing domain 608 or identifying an entirely new path through the segment routing domain 608. Further, the segment routing controller can identify the new path based on quality of service requirements of traffic associated with the previous path. For example, the segment routing controller can identify a new path that meets the bandwidth requirements of an application. The segment routing controller can identify a new path based on a path identified by the SDWAN controller, similar to the technique discussed previously with respect to the SDWAN controller identifying a path and the segment routing controller identifying the next shortest path that meets quality of service requirements.

Figure 7:
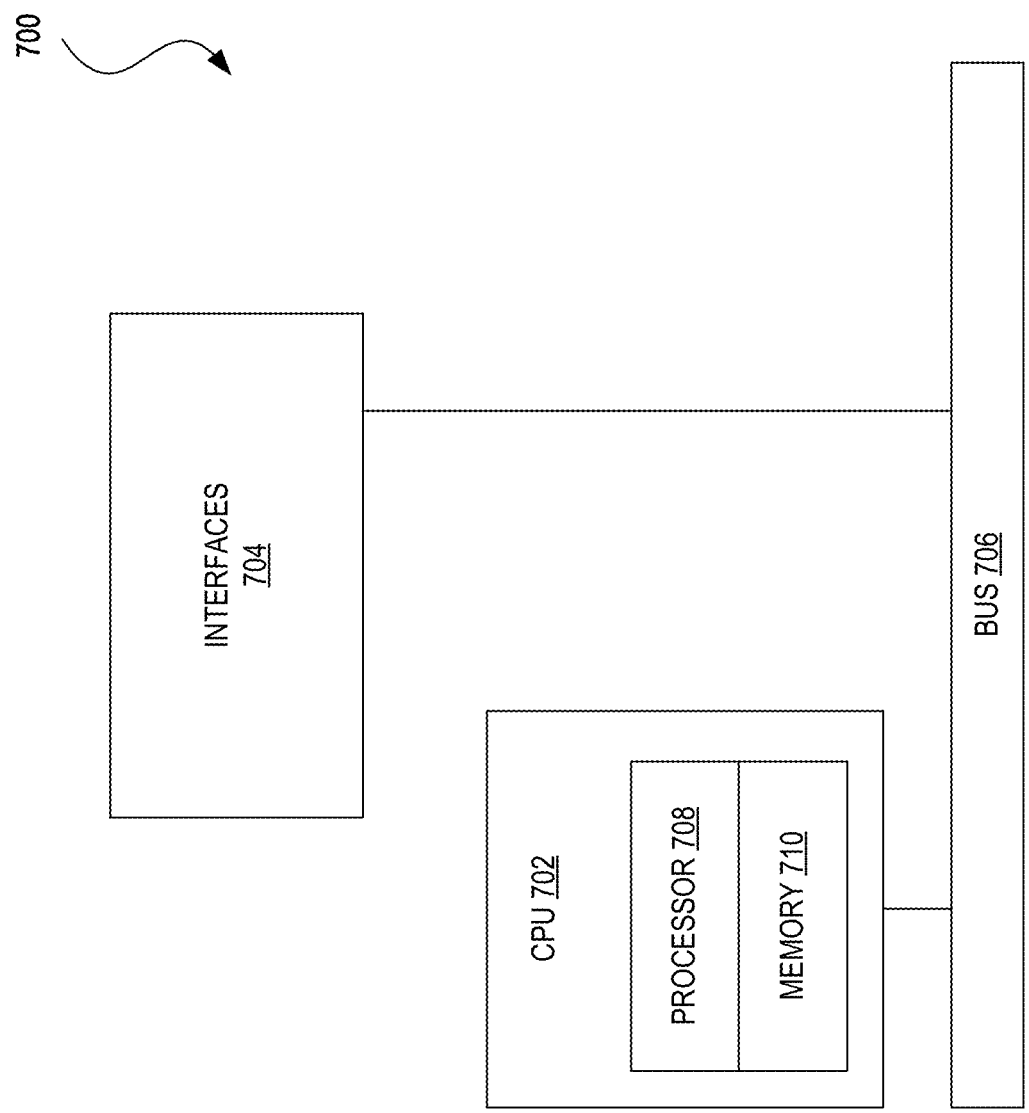
FIG. 7 illustrates an example of a network device.

FIG. 7 illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
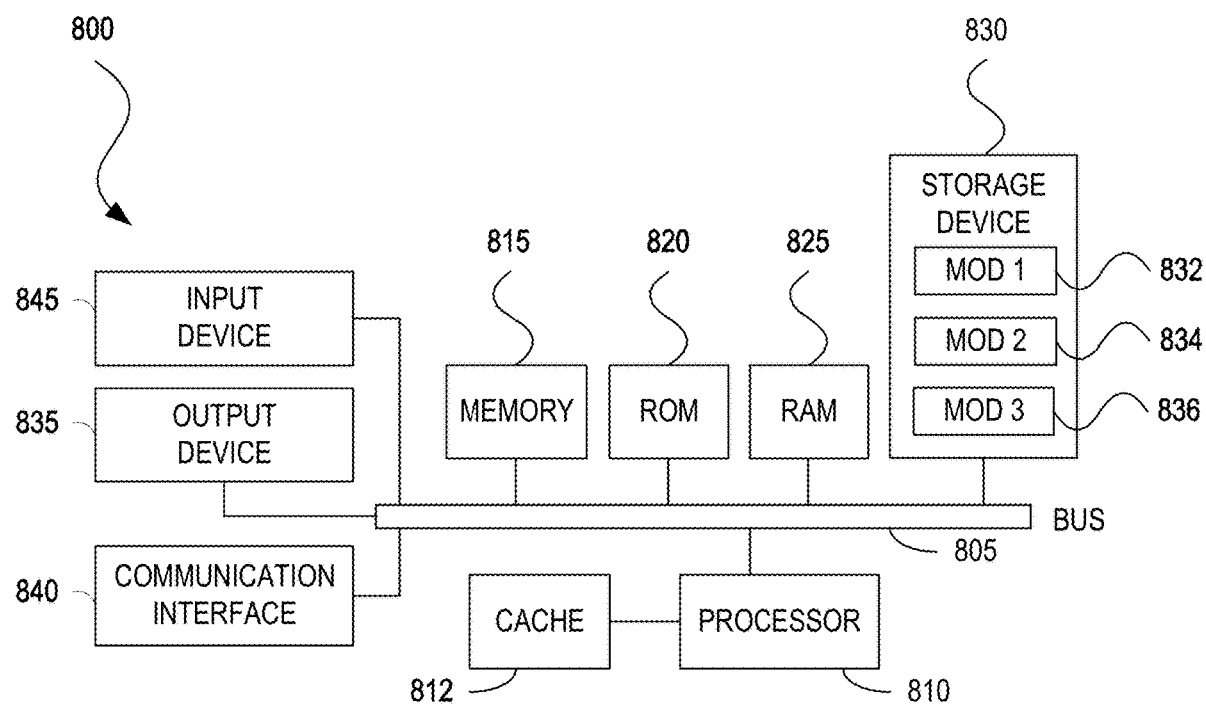
FIG. 8 illustrates an example of a bus computing system wherein the components of the system are in electrical communication with each other using a bus.

FIG. 8 illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
identifying a second network coupled to a first software-defined wide area network (SDWAN) through an SDWAN fabric;
receiving, at the first SDWAN, first data transmitted from the second network to the first SDWAN through a segment routing domain formed across a wide area network (WAN) underlay of the SDWAN fabric; and
transmitting, from the first SDWAN, second data to the second network through the segment routing domain.

2. The method of claim 1, wherein the second network is a second SDWAN network.

3. The method of claim 1, wherein the second network is not an SDWAN network.

4. The method of claim 1, wherein the SDWAN fabric comprises a plurality of paths pre-built through the WAN underlay between the first SDWAN and the second network, wherein the plurality of paths are selectable to control data transmission between the first SDWAN and the second network through the segment routing domain.

5. The method of claim 4, wherein the plurality of paths are changeable to control data transmission between the first SDWAN and the second network through the segment routing domain.

6. The method of claim 1, further comprising:
identifying paths in the segment routing domain between the first SDWAN and the second network;
associating the paths in the segment routing domain with specific traffic classes of data capable of being transmitted between the first SDWAN and the second network; and
controlling transmission of data between the first SDWAN and the second network over a specific path in the segment routing domain based on a traffic class of the data and associations of the paths with the specific traffic classes of data.

7. The method of claim 6, wherein two nodes in an identified path in the segment routing domain between the first SDWAN and the second network are configured as path computation element nodes in the WAN underlay by a segment routing controller.

8. The method of claim 6, further comprising:
ascertaining quality of service requirements for transmitting data of a specific traffic class between the first SDWAN and the second network;
identifying an appropriate path in the segment routing domain between the first SDWAN and the second network based on the quality of service requirements; and
controlling transmission of data of the specific traffic class over the appropriate path in the segment routing domain between the first SDWAN and the second network through segment routing.

9. The method of claim 8, wherein the quality of service requirements includes either or both bandwidth and latency requirements for transmitting data of the specific traffic class.

10. A system comprising:
one or more processors; and
a computer-readable medium comprising instructions stored therein, which when executed by the one or more processors, cause the one or more processors to:
identify a second network coupled to a first software-defined wide area network (SDWAN) through an SDWAN fabric;
receive at the first SDWAN, first data transmitted from the second network to the first SDWAN through a segment routing domain formed across a wide area network (WAN) underlay of the SDWAN fabric; and
transmit, from the first SDWAN, second data to the second network through the segment routing domain.

11. The system of claim 10, wherein the second network is a second SDWAN network.

12. The system of claim 10, wherein the second network is not an SDWAN network.

13. The system of claim 10, wherein the SDWAN fabric comprises a plurality of paths pre-built through the WAN underlay between the first SDWAN and the second network, wherein the plurality of paths are selectable to control data transmission between the first SDWAN and the second network through the segment routing domain.

14. The system of claim 13, wherein the plurality of paths are changeable to control data transmission between the first SDWAN and the second network through the segment routing domain.

15. The system of claim 10, wherein the instructions, which when executed by the one or more processors, further cause the one or more processors to:
identify paths in the segment routing domain between the first SDWAN and the second network;
associate the paths in the segment routing domain with specific traffic classes of data capable of being transmitted between the first SDWAN and the second network; and
control transmission of data between the first SDWAN and the second network over a specific path in the segment routing domain based on a traffic class of the data and associations of the paths with the specific traffic classes of data.

16. The system of claim 15, wherein two nodes in an identified path in the segment routing domain between the first SDWAN and the second network are configured as path computation element nodes in the WAN underlay by a segment routing controller.

17. The system of claim 15, wherein the instructions, which when executed by the one or more processors, further cause the one or more processors to:
ascertain quality of service requirements for transmitting data of a specific traffic class between the first SDWAN and the second network;
identify an appropriate path in the segment routing domain between the first SDWAN and the second network based on the quality of service requirements; and
control transmission of data of the specific traffic class over the appropriate path in the segment routing domain between the first SDWAN and the second network through segment routing.

18. The system of claim 17, wherein the quality of service requirements includes either or both bandwidth and latency requirements for transmitting data of the specific traffic class.

19. A non-transitory computer-readable storage medium comprising instructions stored therein, which when executed by one or more processors, cause the one or more processors to:
- identify a second network coupled to a first software-defined wide area network (SDWAN) through an SDWAN fabric;
- receive, at the first SDWAN, first data transmitted from the second network to the first SDWAN through a segment routing domain formed across a wide area network (WAN) underlay of the SDWAN fabric; and
- transmit, from the first SDWAN, second data to the second network through the segment routing domain.

20. The non-transitory computer-readable storage medium of claim 19, wherein the instructions further cause the one or more processors to:
- identify paths in the segment routing domain between the first SDWAN and the second network;
- associate the paths in the segment routing domain with specific traffic classes of data capable of being transmitted between the first SDWAN and the second network; and
- control transmission of data between the first SDWAN and the second network over a specific path in the segment routing domain based on a traffic class of the data and associations of the paths with the specific traffic classes of data.

\* \* \* \* \*